(12) United States Patent
Krause (10) Patent No.: US 9,579,761 B2
(45) Date of Patent: Feb. 28, 2017

(54) ROUTER ATTACHMENT ASSEMBLY HAVING A CUTTING BLADE FOR FORMING A PROFILE

(71) Applicant: Advanced Architectural Products, LLC, Allegan, MI (US)

(72) Inventor: G. Matt Krause, Allegan, MI (US)

(73) Assignee: Advanced Architectural Products, LLC, Allegan, MI (US)

( * ) Notice: Subject to any disclaimer, the term of this patent is extended or adjusted under 35 U.S.C. 154(b) by 0 days.

(21) Appl. No.: 15/171,381

(22) Filed: Jun. 2, 2016

(65) Prior Publication Data

US 2016/0318141 A1  Nov. 3, 2016

Related U.S. Application Data

(63) Continuation-in-part of application No. 14/459,300, filed on Aug. 13, 2014, now Pat. No. 9,469,044, and
(Continued)

(51) Int. Cl.
*B27C 5/10* (2006.01)
*B23Q 9/00* (2006.01)
(Continued)

(52) U.S. Cl.
CPC .............. *B23Q 9/0028* (2013.01); *B27C 5/10* (2013.01); *E04B 1/762* (2013.01); *E04B 1/80* (2013.01);
(Continued)

(58) Field of Classification Search
CPC ... Y10T 409/309184; Y10T 409/30924; Y10T 409/306272; Y10T 409/306384;
(Continued)

(56) References Cited

U.S. PATENT DOCUMENTS 2,525,894 A * 10/1950 Graham ................. B23Q 3/002
144/242.1
2,699,804 A * 1/1955 Starnes .................. B23Q 3/002
144/242.1
(Continued)

FOREIGN PATENT DOCUMENTS

DE            3224750 A1 * 1/1984 ............... B32Q 5/26

*Primary Examiner* — Daniel Howell
*Assistant Examiner* — Nicole N Ramos
(74) *Attorney, Agent, or Firm* — The Watson IP Group, PLC; Jovan N. Jovanovic; Vladan M. Vasiljevic (57) ABSTRACT

A router attachment assembly including a base plate, a first side support structure and a second side support structure. The base plate has an upper surface and a lower surface. A plurality of router attachment openings extend through the base plate, which are configured to correspond to openings on a router. Fasteners couple the base plate to the router through the router attachment openings. A central router axle opening allows a router axle to pass therethrough. The first side support structure extends from the base plate and defines a front face. The second side support structure extends from the base plate on an opposing side of the central router opening. The second side support structure includes a biasing member biased toward the first side support structure, to, in turn, urge a material extending through the channel toward and into contact with the first side support structure.

19 Claims, 6 Drawing Sheets

Related U.S. Application Data a continuation-in-part of application No. 15/083,134, filed on Mar. 28, 2016.

(51) Int. Cl.
*E04B 1/76* (2006.01)
*E04B 1/80* (2006.01)
*B23C 1/20* (2006.01)

(52) U.S. Cl.
CPC .............. *B23C 1/20* (2013.01); *B23Q 9/0014* (2013.01); *Y10T 409/306384* (2015.01); *Y10T 409/306608* (2015.01)

(58) Field of Classification Search
CPC . Y10T 409/306552; Y10T 409/306608; B27C 1/002; B27C 5/06; B27C 5/10; B23C 5/10; B23C 5/04; B23C 5/06; B23C 1/20; B23Q 9/0014
USPC ......... 144/253.6, 253.7, 253.2, 144.1, 145.1, 144/145.2
See application file for complete search history.

(56) References Cited

U.S. PATENT DOCUMENTS

| | | | | | |
|---|---|---|---|---|---|
| 4,132,256 | A | * | 1/1979 | Jones | B23Q 3/002 144/250.2 |
| 4,197,887 | A | * | 4/1980 | Groves | B23Q 35/106 144/136.95 |
| 4,281,694 | A | * | 8/1981 | Gorman | B23Q 9/00 144/136.95 |
| 4,830,074 | A | * | 5/1989 | Lundblom | B23Q 3/005 144/251.3 |
| 4,942,912 | A | * | 7/1990 | Gakhar | B23Q 9/0028 144/136.1 |
| 5,289,861 | A | * | 3/1994 | Hedrick | B23Q 9/00 144/134.1 |
| 5,715,880 | A | * | 2/1998 | Tucker | B23Q 3/002 144/134.1 |
| 7,017,464 | B2 | * | 3/2006 | Coderre | B23Q 3/002 83/420 |
| 7,299,840 | B1 | * | 11/2007 | Moschetti | B23D 47/04 144/253.6 |
| 2006/0157155 | A1 | * | 7/2006 | Robinson | B27C 1/04 144/136.95 |
| 2011/0192497 | A1 | * | 8/2011 | Clark | B27C 5/04 144/371 |
| 2013/0199671 | A1 | * | 8/2013 | Brodersen | B27B 25/06 144/253.6 |

\* cited by examiner

ROUTER ATTACHMENT ASSEMBLY HAVING A CUTTING BLADE FOR FORMING A PROFILE

CROSS-REFERENCE TO RELATED APPLICATION

This application is a continuation-in-part of U.S. patent application Ser. No. 14/459,300 filed Aug. 13, 2014, entitled "Router Attachment Assembly", the entire specification of which is hereby incorporated by reference. This application is a continuation in part of U.S. patent application Ser. No. 15/083,134 entitled Jamb Assembly For Use in Association with An Insulation System, which claims priority from U.S. Provisional Patent Application Ser. No. 62/139,627 filed Mar. 27, 2015, entitled "Insulation System For Buildings in Horizontal Installations", the entire specification of which is hereby incorporated by reference. This application claims priority from U.S. Provisional Patent Application Ser. No. 62/139,628 filed Mar. 27, 2015, entitled "Insulation System For Buildings in Vertical Installations", the entire specification of each of which is hereby incorporated by reference.

BACKGROUND OF THE DISCLOSURE

1. Field of the Disclosure

The invention relates in general to a jig for a router, and more particularly, to a router attachment assembly having a cutting blade, which positions and directs a material to be cut by the router and the cutting blade. Generally, the router comprises a hand held router device. The configuration allows for cutting in multiple planes so as to form, for example, a profile through multiple cuts.

2. Background Art

The use of foam board insulation is known in the art. It is often the case that such insulation is utilized on the outside of buildings, over the studs and underneath metal cladding in a commercial building configuration. In many applications, the insulation is provided in sheets that are cut to the appropriate dimensions and then coupled to girts that are attached to the building studs or the like.

It is often the case, that trimming, cutting and fitting are done outside at the job site. Problematically, some of the trimming, cutting and fitting is difficult to accomplish at the job site, and, more particularly, difficult to properly execute. At the jobsite, it is difficult to accurately measure and cut the insulation to desired specifications. Additionally, the insulation is often not uniform (as it may vary in thickness within a single sheet, and over a set of sheets). As a result, it is even more difficult to properly make successive operations and have the different sheets accurately assemble on the girts that are on the studs. Additionally, in some instances it is necessary to form a groove or other feature on two adjoining or abutting walls of an outside panel, such as a sheet of insulation.

SUMMARY OF THE DISCLOSURE

The disclosure is directed to a router attachment assembly comprising a base plate, a first side support structure, a second side support structure and a cutting blade. The base plate has an upper surface and a lower surface opposite the upper surface. A plurality of spaced apart router attachment openings extend through the base plate, configured to correspond to openings on a router. Fasteners are configured to couple the base plate to the router through such spaced apart router attachment openings. A central router axle opening is configured to allow a router axle to pass therethrough upon coupling the base plate to the router. The first side support structure extends from the base plate and defining a front face. The second side support structure extends from the base plate on an opposing side of the central router axle opening from the first side support structure. The first side and the second side supports with the base plate defining a channel for material to extend through. The cutting blade is extendable at least partially from the front face and into the channel. The second side support structure includes a biasing member biased toward the first side support structure, to, in turn, urge a material extending through the channel toward and into contact with the first side support structure.

In some configurations, the upper surface of the base plate is substantially planar within the channel, and the first side support structure is substantially perpendicular to the upper surface of the base plate.

In some configurations, the cutting blade is positioned so as to be substantially perpendicular to the upper surface of the base plate.

In some configurations, the first side support structure further includes a blade retention portion having a blade base extending from the front face opposite the channel defined thereby. The blade base has a channel defined therein. The channel terminates at an opening in the front face. The channel is configured to retain the cutting blade therein. A portion of the cutting blade is extendable through the opening in the front face.

In some configurations, the blade retention portion further includes a plurality of upstanding walls extending around the blade base to define a cavity, with a blade retaining plate positionable within the cavity, and fastened thereto. Such a configuration sandwiches the cutting blade between the blade base and the channel defined thereby and the blade retaining plate.

In some configurations, the cavity comprises a generally rectangular cubic configuration, and the blade retaining plate comprises a generally rectangular cubic configuration.

In some configurations the cutting blade is positionable in at least two orientations. In a first orientation, the cutting blade remains entirely within the channel in the blade base without extending into the channel defined by the first side support structure and the second support structure. In a second orientation, a portion of the cutting blade extends through the opening in the front face.

In some configurations, the cutting blade is positioned downstream of the central router axle opening, to in turn, allow a router bit positioned therethrough to contact the material prior to the cutting blade.

In some configurations, the cutting blade comprises a utility blade having a generally trapezoidal configuration.

In some configurations, the biasing member includes a contact face, the contact face being substantially perpendicular to the upper surface of the base plate.

In some configurations, the second side support structure includes a body structure fixed to the base plate. The biasing member comprising a leaf spring that has a first end coupled to the body structure of the second side support structure and a second end extending therefrom. The leaf spring is pivotable about the first end so that the position of the second end can be varied relative to the first side support structure.

In some configurations, the leaf spring includes a contact face that is configured to interface with the material positioned within the channel.

In some configurations, the leaf spring is substantially convex in the direction of the first side support structure.

In some configurations, the contact face is substantially perpendicular to the base plate.

In some configurations, the biasing member is integrally molded with the second side support structure which is integrally molded with the base plate.

In some configurations, the first side support structure includes a body structure extending from the front face in a direction away from the second side support structure.

In some configurations, the body structure further comprises an outer panel and support webbing positioned therebetween.

In some configurations, the assembly further includes a blade retention portion having a plurality of upstanding walls formed by the front face and the outer panel, and a first and second adjacent support webbing, to, in turn, define a cavity with a blade base extending therebetween.

In some configurations, the blade base is substantially perpendicular to each of the upstanding walls. The blade base further includes a channel defined therein for retaining the cutting blade.

BRIEF DESCRIPTION OF THE DRAWINGS

The disclosure will now be described with reference to the drawings wherein.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
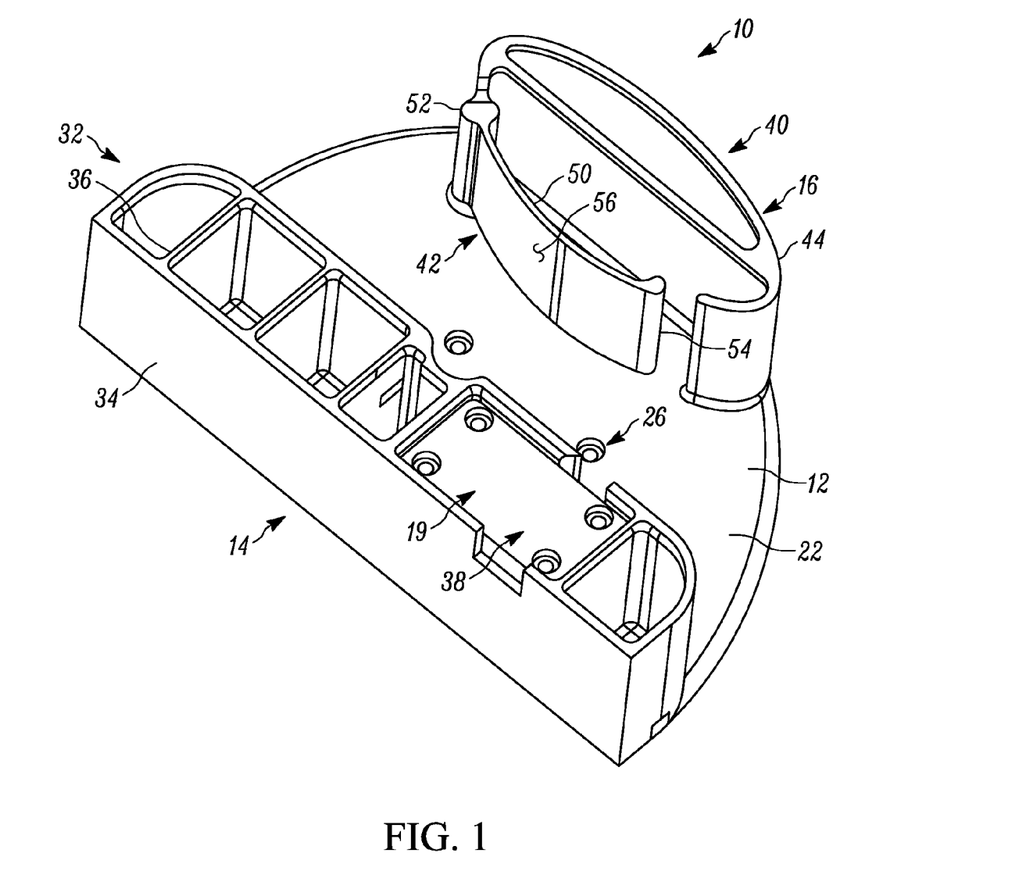
FIG. 1 of the drawings is a perspective view of the router attachment assembly of the present disclosure, showing, in particular, the configuration of the body structure of the first side support structure.
Figure 8:
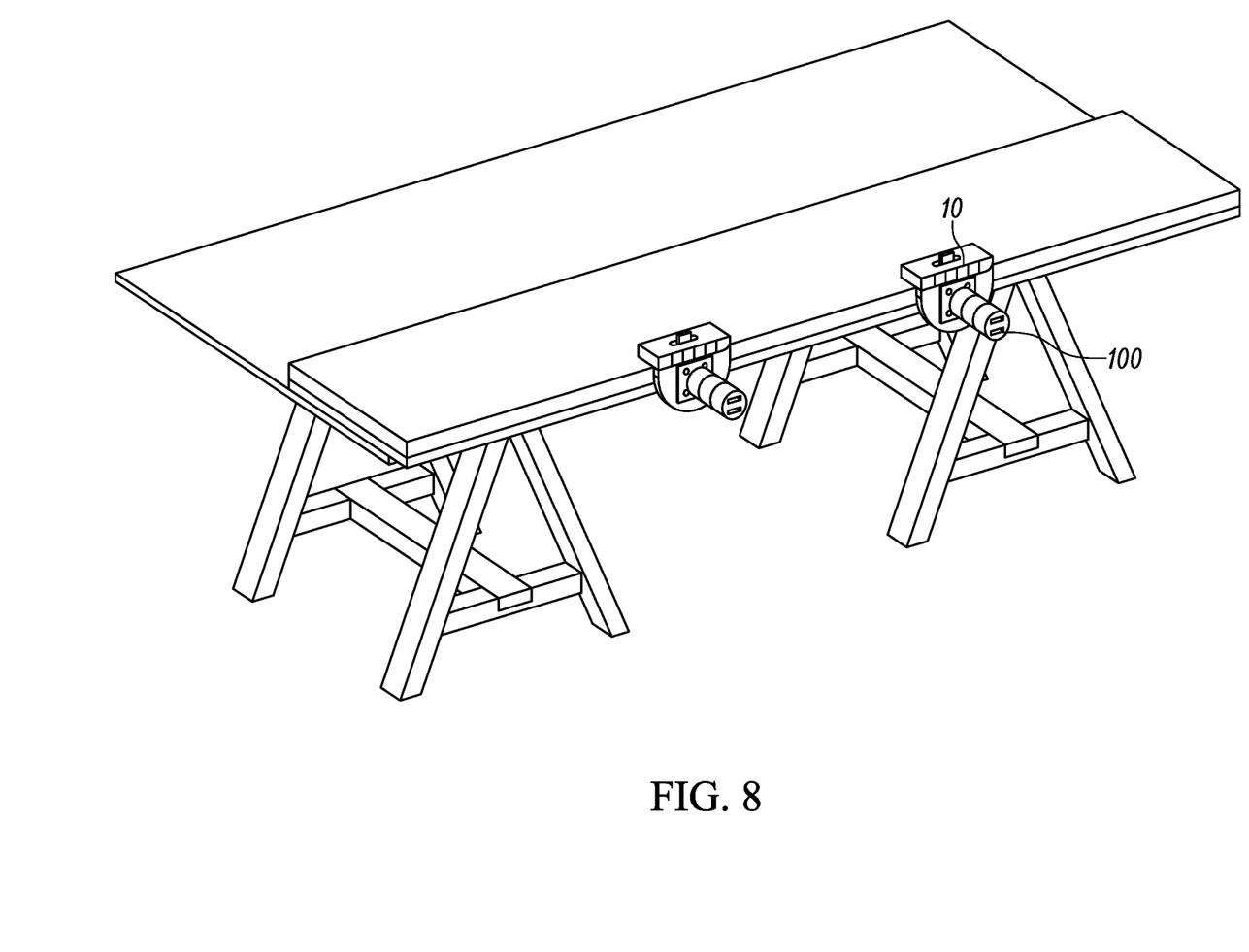
FIG. 8 of the drawings is a schematic perspective view of the operation of the router attachment assembly of the present disclosure, as well as the operation of the router attachment assembly shown in U.S. patent application Ser. No. 14/459,300.

Referring now to the drawings and in particular to FIGS. 1 and 8, the router attachment assembly is shown generally at 10. The router attachment assembly is configured for attachment to a hand-held router so as to make a profile from a side or end of stock material. In one use, the router attachment assembly is configured for the making of a profile on one end of a piece of material, by cutting out a portion along the length thereof, so as to form a thinner portion of the panel at an end thereof. Of course, the use of the router attachment assembly is not limited to such a use, and, it will be understood that other uses are likewise contemplated.

Figure 7:
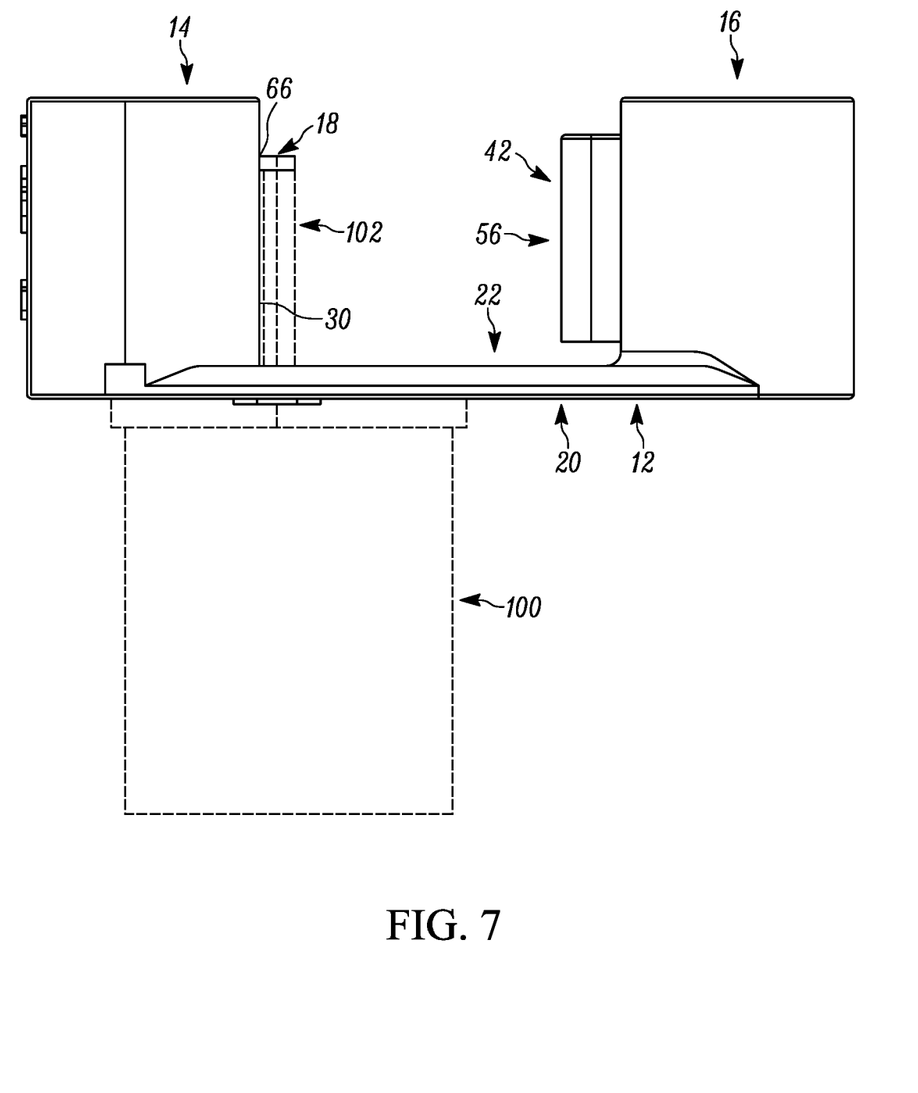
FIG. 7 of the drawings is a side elevational view of the router attachment assembly of the present disclosure, showing schematically a router 100 coupled thereto, and showing, in particular, the relationship between the cutting blade and the router bit 102.

Among other solutions, the router attachment assembly is shown in a configuration that can be coupled to a RIDGID™ brand router, model number R2401, available from HOME DEPOT™ of Atlanta, Ga. It will be understood that the router attachment assembly may be coupled to any number of different routers, and that the base plate 12 may be adapted (i.e., the attachment openings and axle opening may be moved and adjusted in relative position) so as to be attached to other routers, zip saws, or other rotating bit driven tools. A schematic coupling is shown in FIG. 7.

Figure 2:
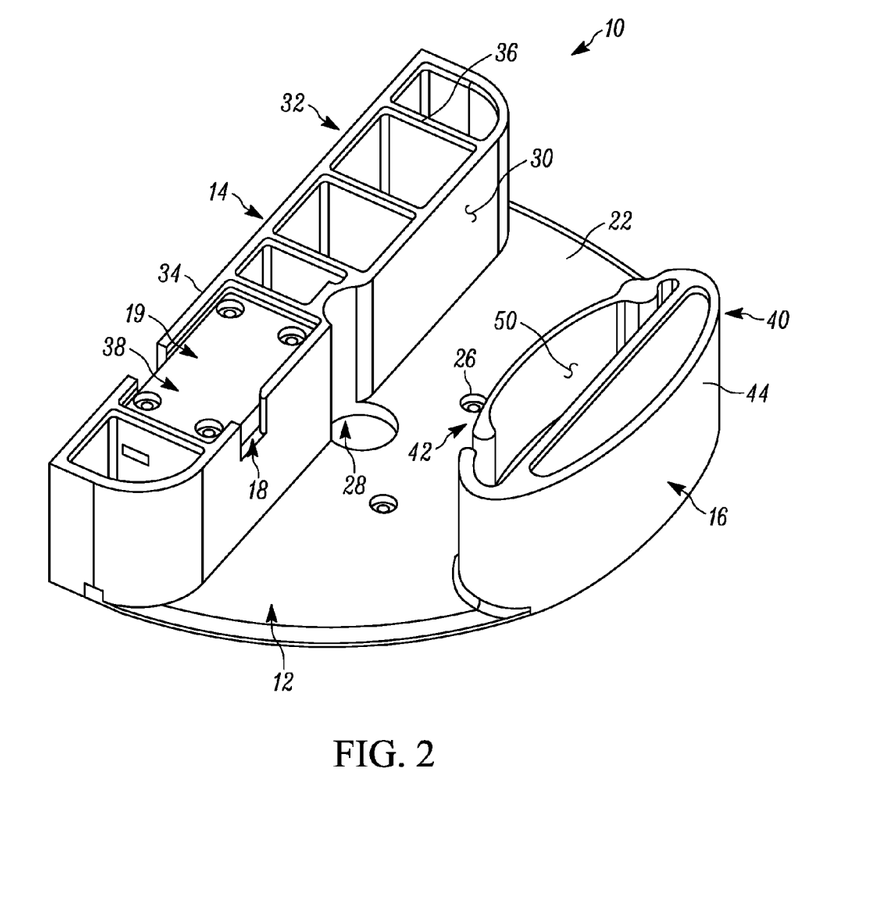
FIG. 2 of the drawings is a perspective view of the router attachment assembly of the present disclosure, showing, in particular, the configuration of the second side support structure.

With reference to FIGS. 1 and 2, collectively, the router attachment assembly 10 is shown as comprising base plate 12, first side support structure 14, second side support structure 16, cutting blade 18, and blade retaining plate 19. It is contemplated that the base plate 12, the first side support structure 14 and the second side support structure 16 are formed from a single integrally formed member that can be from a polymer based material, or a composite material. Of course, other materials, such as wood or metal castings or machinings are contemplated. Additionally, it is contemplated that instead of a single integrally formed member, the router attachment assembly may be assembled from a plurality of separate components. In one configuration, the router attachment assembly comprises a three dimensional printed part that is formed in a three dimensional printer.

With further reference to FIGS. 1 and 2 (and FIG. 4), the base plate 12 includes lower surface 20 (FIG. 4) and upper surface 22 which define outer perimeter 24 do not see. The base plate is substantially planar and provides a base surface upon which to guide the material to be cut as well as a base surface to which the router may be coupled. It will be understood that the material is slid along the upper surface 22 whereas the router is attached to the lower surface 20. In the embodiment shown, the base plate is approximately a quarter of an inch thick, with the upper and lower surfaces being substantially identical (that is, the outer perimeter is substantially uniformly perpendicular to the upper and lower surfaces). The thickness of the base plate and the shape of the base plate can be varied depending on the material to be cut and the material from which the base plate is made. The configuration of the base plate and the size of the base plate for the particular configuration shown is for purposes of ease of holding by the hand of a user. Further structures which allow for improved hand manipulation are likewise contemplated.

Figure 4:
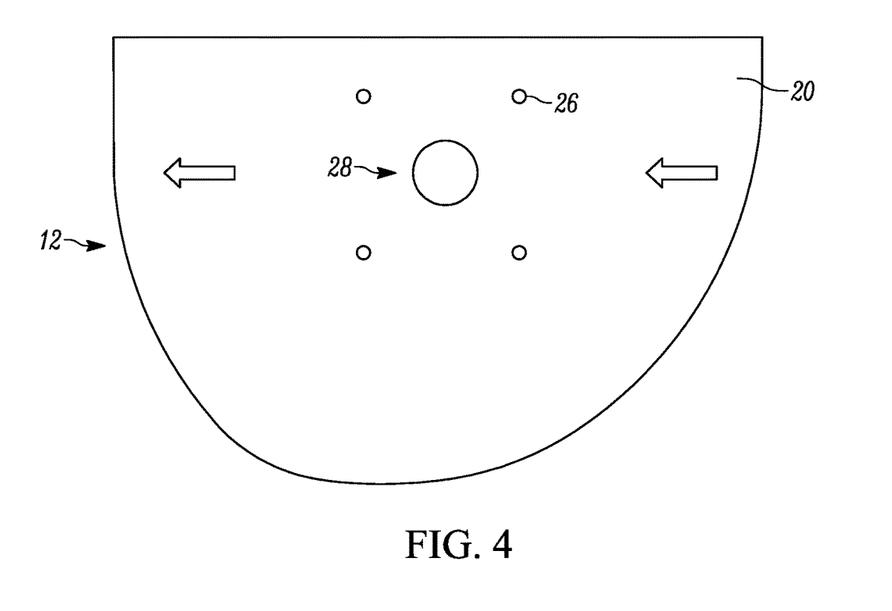
FIG. 4 of the drawings is a bottom plan view of the router attachment assembly of the present disclosure.

The base plate 12 includes a plurality of router attachment openings 26 which are configured to match with, or correspond to, threaded fasteners or openings on the router. For example, with the router identified above, the positioning of the router attachment openings corresponds to threaded openings on the housing base of the router (i.e., for accepting a base plate or a guide or the like). In the configuration shown, a total of four substantially evenly spaced openings extend through the base plate and correspond to four openings.

With continued reference to FIGS. 1, 2 and 4, the central router axle opening 28 is shown as being located on the base plate proximate the first side support structure 14, and, in particular, overlying a portion of the front face 30 so that a curved section provides the necessary clearance. The central router axle opening 28 is configured to allow the extension of the router therethrough. Due to tolerance variations and the like, the central router axle opening 28 is oversized for receipt of the router axle. It will be understood that the position may be varied depending on the application, so as to provide the proper position of the router bit, so as to remove or cut a desired portion of the panel extending therethrough.

In some embodiments, and not shown, but with reference made to the co-pending parent application, the router attachment openings 26 may comprise a plurality of sets of router attachment openings, each set of which is rotationally offset from the last or previous set. Depending on the one of sets of router attachment openings to which the user couples the router, the relative position of the router vis-à-vis the base plate can be varied slightly (i.e., each set moves the router bit toward or away from the first side support structure a predetermined distance). As such, the set of router attachment openings to which the router is attached determines the spacing of the router axle (and in turn, the slot that is cut in the material) relative to the first side support structure (or to both the first side support structure and the second side support structure). By making the central router axle opening 28 larger than the router axle, regardless of which set of openings are utilized, the router axle remains within the footprint of the central router axle opening. The configuration shown in the figures does not include such a feature, but it would be analogous to such a feature shown in the parent application incorporated by reference herein.

Referring now to FIGS. 1, 2, 3, 5 and 6, the first side support structure 14 is shown in FIG. 1 as comprising front face 30, body structure 32 and blade retention portion 38. The front face 30 includes a portion that is configured to receive and guide the material. That is, the front face 30 is dimensionally configured with the router attachment openings, so that the axle is in a correct position relative to the front face 30. In the configuration shown, the front face includes a substantially planar portion that is perpendicular to the upper surface of the base plate. This generally allows for the squaring up of the material that is to be cut. In other embodiments, additional features such as grooves, guides or the like may be employed to position the material in the position desired. A portion of the front face is cutaway so as to allow for the extension of the router bit therethrough, as the portion of the panel that is to be removed is relatively thin, and occupies the space between the front face and the router axle opening.

The body structure 32 provides rigidity to the front face, provides a platform for the cutting blade and retaining plate, and, provides a portion that can be grasped by the hand of a user. The body structure, more particularly, includes outer panel 34 and support webbing 36. The outer panel 34 extends generally around the front face from one side to the other side. The support webbing provides rigidity by tying the body structure to the front face. In the embodiment shown, due to the position of the router attachment openings, portions of the front face were removed to provide access thereto. In other embodiments, the front face may comprise a continuous member.

Figure 5:
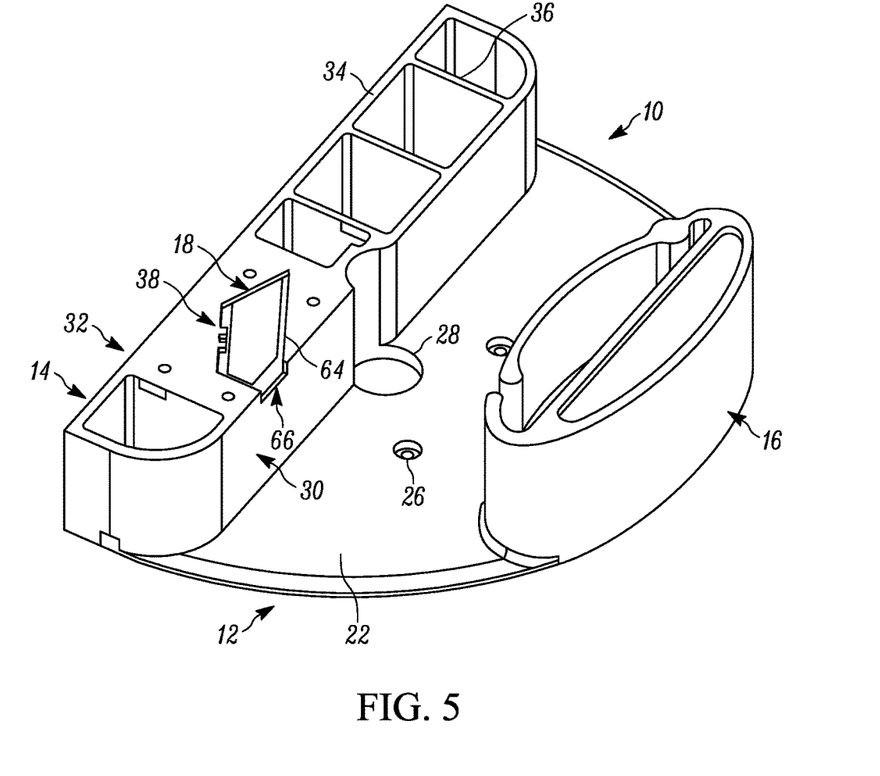
FIG. 5 of the drawings is a cross-sectional perspective view of the router attachment assembly of the present disclosure, showing, in particular, the cutting blade.
Figure 6:
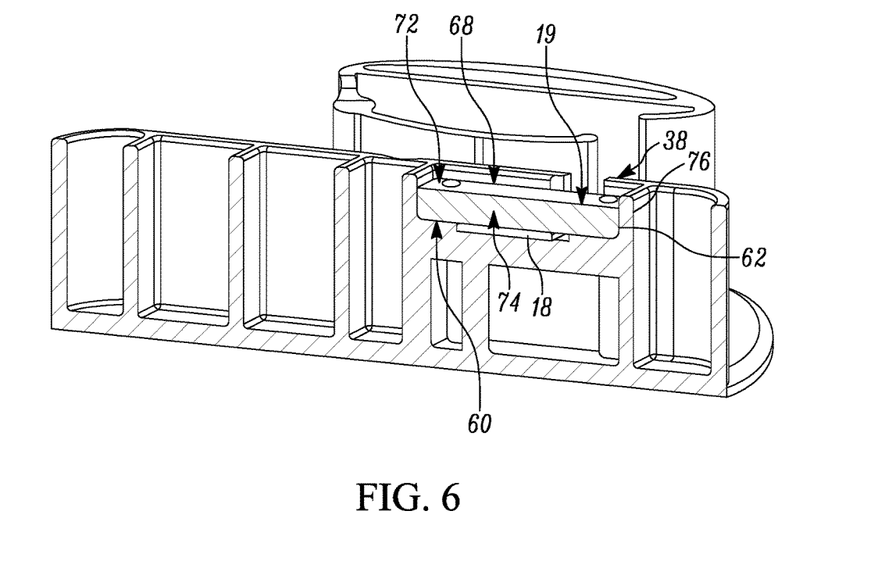
FIG. 6 of the drawings is a cross-sectional perspective view of the router attachment assembly of the present disclosure, showing, in particular, the orientation of the blade retaining plate within the blade retention portion.

The blade retention portion 38 is shown in FIGS. 4, 5 and 6 as comprising blade base 60 and upstanding walls 62. The blade base 60 includes channel 64. The channel 64 is configured to receive, and retain in general engagement, a blade. Preferably, the blade retention portion is positioned what would be downstream of the central router axle opening, so that the slot is preferably formed before the cut is executed by the cutting blade. In such a configuration, the integrity of the reference surface (for purposes of the depth of the cut of the blade and the router) which is against the front face is maintained in an integrated fashion. It will be understood that in other configurations, the cutting blade and the central router axle opening may be positioned in the same plane, so that the operations happen substantially simultaneously in close proximity. In yet other configurations, it may be advantageous to perform the cut by the cutting blade prior to the formation of the slot by the router bit.

In the configuration shown, the channel 64 is configured to receive, in generally mating engagement, a commonly known utility blade. The channel shape matingly engages features of the blade so as to generally preclude the slidable movement and the rotatable movement of the blade relative to the channel and the base. The distal end of the channel that interfaces with the front face 30 defines blade opening 66. The particular configuration of the channel and the size of the front face and the angle of disposition determines the amount of the blade that extends out of the blade opening 66 and the angle of the blade relative to the front face. In the configuration shown, the blade is at a raked angle so as to facilitate the smooth cutting of the panel. Additionally, the blade sticks out a sufficient amount so as to meet the channel cut by the router, so that the cut with the blade meets the channel cut by the router.

It is contemplated that the position of the blade in the channel may be adjustable so as to adjust to differing depths. For example, the blade may be slidably movable and selectively lockable in place. In other configurations, the blade may be positioned or indexed into a number of different configurations along the channel.

It will further be understood that the blade base 60 and the channel 64 is generally parallel to the base plate so that the cut formed is generally perpendicular to the groove or slot formed by the router bit. In such a configuration, the blade is also generally perpendicular to the front face 30 of the first side support structure 14. Of course, variations are contemplated.

The upstanding walls 62 generally define a rectangular configuration that remains generally within the boundaries of the front face and the outer panel. The side ends may be formed by, or take the shape of support webbing, whereas the sides may be formed by, or take the shape of the front face and the outer panel. The upstanding walls, together with the base generally define a cavity 68.

Figure 3:
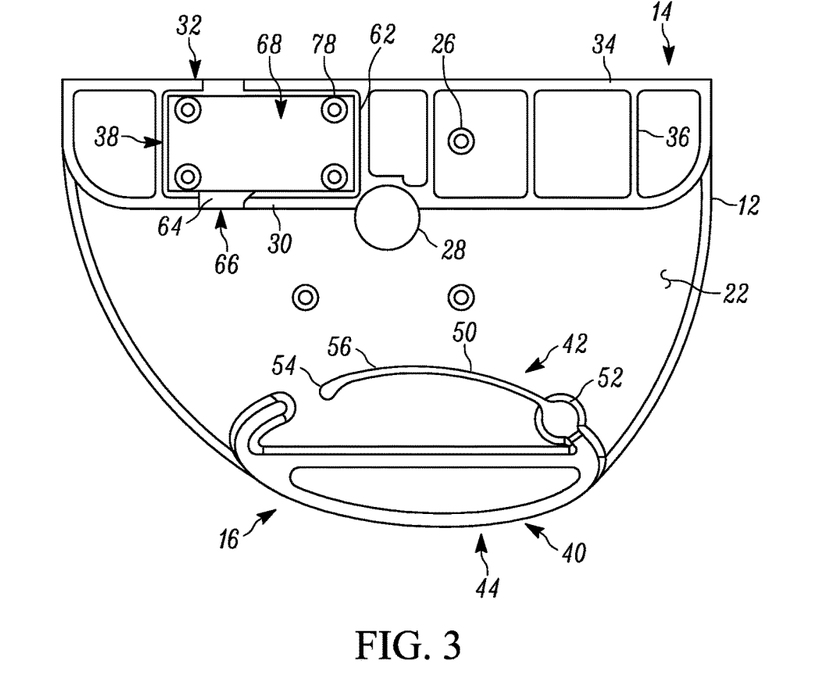
FIG. 3 of the drawings is a top plan view of the router attachment assembly of the present disclosure.

The second side support structure 16 is shown in FIGS. 1, 2 and 3 as comprising body structure 40 and biasing member 42. The body structure 40 includes outer panel 44 having a first end and second end. In the embodiment shown, the outer panel follows the perimeter and then arcs inwardly at both the first end and the second end. The outer panel provides for stability and security of the biasing member, as well as being configured for grasping by a user.

The biasing member 42 is shown as comprising a leaf spring 50 having a first end 52, a second end 54 and a contact face 56. The leaf spring is coupled at a first end 52 to the first end of the outer panel 44 and the second end 54 extends toward the second end of the outer panel 44. The leaf spring 50 is arcuate and inwardly convex toward the first side support structure. The inner surface facing the first side support structure includes a contact face 56 which is configured to engage material to be cut that is positioned in the channel defined by the front face 30, the base plate 12 and the contact face 56 toward the front face of the first side support structure. In other embodiments, the leaf spring may be coupled to another portion of the body structure.

In still other embodiments and configurations, the biasing member may comprise a compression spring, a coil spring, or an pneumatic member which imparts a force on the material to be cut to urge the material toward and into contact with the front face of the first side support structure. For example, a member forming the contact face can be coupled to one end of such a biasing member, and the biasing member may be coupled to the body structure of the second side support structure, with the biasing member directing the contact face toward the first side support structure. In yet another embodiment, the biasing member may comprise a foam member that can be elastically deformed, whereupon a biasing force can be exerted by the foam member returning to its original configuration.

The cutting blade 18, as set forth above, comprises a utility knife blade that is generally known in the art. Such a blade generally has a trapezoidal configuration, with the blade comprising the longer one of the parallel walls, with slots and channels in the opposing parallel walls for purposes of securement. In the configuration shown, the blade extends from the opening 66 in the front face, which defines the end of the channel. Of course, the utility knife blade is merely exemplary, and it is contemplated that other blades may be utilized, such as an X-ACTO™ knife blade, available from ELMER™ Products, Inc. of Westerville, Ohio, among other known blades. Of course, in other configurations, a specialty blade may be provided, which is custom for the application. In some configurations, the blade may be molded into the channel, or may be molded to the blade retaining plate.

In some configurations, a utility knife blade having a generally trapezoidal configuration may be utilized, with one of the corners cut. Such a utility knife blade may be positioned within the channel in two orientations (i.e., face up or face down). In one configuration, a portion of the cutting blade extends through the opening in the front face. In the other orientation, the entirety of the cutting blade remains in the channel. As such, the cutting blade is positionable in a stowed orientation, wherein inadvertent contact with the cutting blade can be precluded. In the other configuration, the cutting blade is ready for use.

The blade retaining plate 19 is shown in FIG. 6 as comprising top surface 72, bottom surface 74, and side surfaces 76. The blade retaining plate in the configuration shown, generally comprises a substantially rectangular cuboid. The top and bottom surfaces are configured to match the configuration of the blade base with the side surfaces being configured to match the upstanding walls of the blade retention portion. As such, the blade retaining plate 19 can be inserted into the blade retention portion and maintained in substantially fixed orientation therein. In such a configuration, the blade 18 is sandwiched within the channel 64 and the bottom surface 74 of the blade retaining plate. Fasteners, such as fastener 78, may be utilized to couple the blade retaining plate with the blade retention portion. In other configurations, the configuration may include springs or other biasing members to further provide increased stability or downforce upon the blade to maintain the position of the blade. In other configurations, the blade may be, as identified above, integrally molded with the blade retaining plate.

In operation, the user first is provided with the router attachment assembly and a router of a type which is configured to matingly engage with the router attachment assembly. The user positions the base plate 12 in a position that the router attachment openings correspond with the threaded openings found on the router. Once the openings have been lined up, fasteners can be extended through the router attachment openings and fastened to the router. The openings may include an annular recess to allow for the countersinking of the fasteners at or below the upper surface of the base plate. One such configuration is shown, schematically, in FIG. 7.

With reference to FIGS. 5, 6 and 7, the user additionally positions the blade within the channel 64 of the blade retention portion. Once positioned, the user can position the blade retaining plate 19 within the cavity 68 and couple the structures through the use of fasteners 78. In the configuration shown, it will be understood that the cut made by the blade is perpendicular to the cut or groove formed by the router bit (which, depending on the configuration of the router bit, may resemble more of a milling operation than a cut or a groove, however such terms will be used interchangeably to reference the cutting operation of the router bit). In addition, the two cuts will meet to leave a groove in the material that is of generally uniform thickness and height. It will be understood that the relative angles of the blade and of the router bit could be altered so that the configuration of the removed portion or the formed groove can be altered. Certainly the disclosure is not limited to any particular angular relationship between the cuts/grooves formed by the blade and the router bit. In addition, it is contemplated that multiple blades may be utilized in a spaced apart relationship. Where a relatively deeper cut may be necessary, a first blade may perform the cut to a first depth, with the second blade completing the same cut in the same plane to a second, deeper depth.

Once the blade is attached and the router is fastened, the system is ready for use. A typical procedure is shown in FIG. 8. Namely, a material that is to be cut is positioned on a workbench or table. In other configurations, the user may perform the cut while holding the material. In other configurations, the material may be clamped horizontally, vertically, or obliquely to preclude movement, and to position for a user in the desired orientation.

In particular, the router is activated and a piece of material is inserted into the channel formed by the side support structures and the base plate. It will be understood that in some configurations, and as shown, indicator arrows may be molded into or affixed to the router attachment assembly to direct the user to proper operation (for example, the direction of travel of the apparatus against the panel, or the direction of the feed of the panel). When inserted, the biasing member urges and directs the material toward and into contact with the front face of the first side support structure. The biasing member continues to push against the material to insure that the material remains firmly against the first side support structure. Next, the material is directed longitudinally through the channel. First, the spinning router bit forms a slot in the material, at the precise point desired relative to the outer surface which is abutting the front face. As the material is further extended along the channel, the blade performs a cut that is generally perpendicular and at a depth that reaches the slot made by the router bit, proximate the end thereof. The resulting cut forms an elongated, generally rectangular cubic material, leaving a step down portion in the panel of reduced thickness.

As is shown in FIG. 8, the user can operate both the router attachment assembly of the present disclosure and the router attachment assembly shown in co-pending application Ser. No. 14/459,300 so as to form both a groove along an outward face, and to form the step down portion in sequence. It will be understood that, depending on the particular configuration, either router attachment assembly may be utilized first. However, in the configuration shown, the router attachment assembly of the present disclosure is utilized second, as then both router attachment assemblies utilize the same reference surface and it is believed that greater accuracy results. Of course, such a use is merely illustrative, and not to be deemed limiting. It will also be understood that the two router attachment assemblies can be indexed from opposing surfaces, however, it has been found that there are vast differences and tolerances between insulation panels, and other members which are to be utilized in association with the present disclosure, and, as such, it is often more accurate to utilize the same surfaces for purposes of reference.

Once completed, the configuration formed in the panel is well suited for the receipt and coupling with the structures shown in any one of the disclosures found in U.S. Pat. No. 8,826,620 issued to Krause and U.S. Pat. No. 8,833,025 issued to Krause as well as U.S. application Ser. No. 14/281,949, the entire specification of each of the foregoing patents and patent applications is hereby incorporated by reference.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A router attachment assembly comprising:
    a base plate having an upper surface and a lower surface opposite the upper surface, a plurality of spaced apart router attachment openings extending through the base plate, configured to correspond to openings on a router, whereupon fasteners are configured to couple the base plate to the router through such spaced apart router attachment openings, and a central router axle opening configured to allow a router axle to pass therethrough upon coupling the base plate to the router;
    a first side support structure extending from the base plate and defining a front face;
    a second side support structure extending from the base plate on an opposing side of the central router axle opening from the first side support structure, wherein the first side and the second side supports and the base plate defining a channel for material to extend through; and
    a cutting blade extendable at least partially from the front face and into the channel;
    wherein the second side support structure includes a biasing member biased toward the first side support structure, to, in turn, urge a material extending through the channel toward and into contact with the first side support structure.

2. The router attachment assembly of claim 1 wherein the upper surface of the base plate is substantially planar within the channel, and the first side support structure is substantially perpendicular to the upper surface of the base plate.

3. The router attachment assembly of claim 1 wherein the cutting blade is positioned so as to be substantially perpendicular to the upper surface of the base plate.

4. The router attachment assembly of claim 1 wherein the first side support structure further includes a blade retention portion having a blade base extending from the front face opposite the channel defined thereby, the blade base having a channel defined therein, the channel terminating at an opening in the front face, with the channel configured to retain the cutting blade therein, with a portion of the cutting blade being extendable through the opening in the front face.

5. The router attachment assembly of claim 4 wherein the blade retention portion further includes a plurality of upstanding walls extending around the blade base to define a cavity, with a blade retaining plate positionable within the cavity, and fastened thereto, so as to sandwich the cutting blade between the blade base and the channel defined thereby and the blade retaining plate.

6. The router attachment assembly of claim 5 wherein the cavity comprises a generally rectangular cubic configuration, and the blade retaining plate comprises a generally rectangular cubic configuration.

7. The router attachment assembly of claim 4 wherein the cutting blade is positionable in at least two orientations, in a first orientation, the cutting blade remains entirely within the channel in the blade base without extending into the channel defined by the first side support structure and the second support structure, and in a second orientation, a portion of the cutting blade extends through the opening in the front face.

8. The router attachment assembly of claim 1 wherein the cutting blade is positioned downstream of the central router axle opening, to in turn, allow a router bit positioned therethrough to contact the material prior to the cutting blade.

9. The router attachment assembly of claim 1 wherein the cutting blade comprises a utility blade having a generally trapezoidal configuration.

10. The router attachment assembly of claim 2 wherein the biasing member includes a contact face, the contact face being substantially perpendicular to the upper surface of the base plate.

11. The router attachment assembly of claim 1 wherein the second side support structure includes a body structure fixed to the base plate, the biasing member comprising a leaf spring that has a first end coupled to the body structure of the second side support structure and a second end extending therefrom, wherein the leaf spring is pivotable about the first end so that the position of the second end can be varied relative to the first side support structure.

12. The router attachment assembly of claim 11 wherein the leaf spring includes a contact face that is configured to interface with the material positioned within the channel.

13. The router attachment assembly of claim 12 wherein the leaf spring is substantially convex in the direction of the first side support structure.

14. The router attachment assembly of claim 13 wherein the contact face is substantially perpendicular to the base plate.

15. The router attachment assembly of claim 14 wherein the biasing member is integrally molded with the second side support structure which is integrally molded with the base plate.

16. The router attachment assembly of claim 1 wherein the first side support structure includes a body structure extending from the front face in a direction away from the second side support structure.

17. The router attachment assembly of claim 16 wherein the body structure further comprises an outer panel and support webbing positioned therebetween.

18. The router attachment assembly of claim 17 further including a blade retention portion having a plurality of upstanding walls formed by the front face and the outer panel, and a first and second adjacent support webbing, to, in turn, define a cavity with a blade base extending therebetween.

19. The router attachment assembly of claim 17 wherein the blade base is substantially perpendicular to each of the upstanding walls, and further includes a channel defined therein for retaining the cutting blade.

\* \* \* \* \*